US008469405B2

(12) United States Patent
Wheatley et al.

(10) Patent No.: US 8,469,405 B2
(45) Date of Patent: Jun. 25, 2013

(54) SECURING MECHANISM FOR A COUPLING DEVICE (75) Inventors: David C. Wheatley, Aberdeen, MD (US); Patrick Hulbert, Dallastown, PA (US)

(73) Assignee: Dave Wheatley Enterprises, Inc., Aberdeen, MD (US)

( * ) Notice: Subject to any disclaimer, the term of this patent is extended or adjusted under 35 U.S.C. 154(b) by 72 days.

(21) Appl. No.: 12/906,486

(22) Filed: Oct. 18, 2010

(65) Prior Publication Data

US 2011/0089686 A1    Apr. 21, 2011

Related U.S. Application Data (60) Provisional application No. 61/253,109, filed on Oct. 20, 2009.

(51) Int. Cl.
 *F16L 37/18* (2006.01)

(52) U.S. Cl.
 USPC .......................................... 285/314; 261/149.7

(58) Field of Classification Search
 USPC .................. 403/350, 351, 352; 285/314, 315, 285/394, 395, 358, 359, 362, 308–310; 251/149.6, 149.7, 149.8
 See application file for complete search history.

(56) References Cited

U.S. PATENT DOCUMENTS

| 3,933,378 | A |   | 1/1976  | Sandford et al. |          |
|-----------|---|---|---------|-----------------|----------|
| 4,063,760 | A |   | 12/1977 | Moreiras        |          |
| 4,133,564 | A |   | 1/1979  | Sarson et al.   |          |
| 4,373,405 | A | * | 2/1983  | Geil            | 74/531   |
| 4,451,069 | A |   | 5/1984  | Melone          |          |
| 4,505,310 | A |   | 3/1985  | Schneider       |          |
| 4,522,430 | A |   | 6/1985  | Stromberg       |          |
| 4,597,699 | A |   | 7/1986  | Ramunas         |          |
| 4,624,483 | A |   | 11/1986 | Stromberg       |          |
| 4,778,252 | A | * | 10/1988 | Filho           | 359/819  |
| 4,781,400 | A |   | 11/1988 | Cunningham      |          |
| 4,809,995 | A |   | 3/1989  | Ramunas         |          |
| 4,857,706 | A | * | 8/1989  | Diamond         | 392/383  |
| 4,872,710 | A |   | 10/1989 | Konecny et al.  |          |
| 4,875,715 | A |   | 10/1989 | Dennany, Jr. et al. |      |
| 4,915,523 | A |   | 4/1990  | Andersson       |          |
| 4,971,048 | A |   | 11/1990 | Seekins         |          |
| 5,005,877 | A |   | 4/1991  | Hayman          |          |
| 5,333,915 | A |   | 8/1994  | Sparling et al. |          |
| 5,605,359 | A |   | 2/1997  | Hoff            |          |
| 5,609,370 | A |   | 3/1997  | Szabo et al.    |          |
| 5,662,359 | A |   | 9/1997  | Kargula         |          |
| 5,681,061 | A |   | 10/1997 | Olson           |          |
| 5,730,475 | A |   | 3/1998  | Kargula         |          |
| 5,788,290 | A |   | 8/1998  | Meisinger       |          |
| 5,806,898 | A |   | 9/1998  | Hollnagle       |          |
| 5,882,049 | A |   | 3/1999  | Beans           |          |

(Continued)

*Primary Examiner* — Aaron Dunwoody
(74) *Attorney, Agent, or Firm* — Whiteford, Taylor & Preston LLP (57) ABSTRACT A quick-connect and disconnect securing mechanism is provided for allowing one wearing a protective mask to quickly connect to and drink fluids from a standard drinking fluid container while minimizing the risk of contamination of the fluid or the wearer. The device enables a secure connection of a gas mask to a chemical-biological warfare resistant water pouch to provide safe drinking water in contaminated environments. The securing mechanism is designed to interface with a variety of currently available coupling devices that are typically attached to a protective mask, and particularly for mask drinkstraw systems, and is particularly well suited for an AVON™ type fitting.

14 Claims, 8 Drawing Sheets

U.S. PATENT DOCUMENTS

| | | |
|---|---|---|
| 5,887,911 A | 3/1999 | Kargula |
| 5,918,913 A | 7/1999 | Lewis et al. |
| 6,010,161 A | 1/2000 | Berg et al. |
| 6,155,607 A | 12/2000 | Hewitt et al. |
| 6,168,212 B1 * | 1/2001 | Finley .................. 285/377 |
| 6,231,089 B1 | 5/2001 | DeCler et al. |
| 6,302,451 B1 | 10/2001 | Olson |
| 6,325,116 B1 | 12/2001 | Savage et al. |
| 6,375,152 B1 | 4/2002 | Weh et al. |
| 6,386,596 B1 | 5/2002 | Olson |
| 6,390,511 B1 | 5/2002 | Kargula |
| 6,447,017 B1 | 9/2002 | Gilbreath et al. |
| 6,523,864 B1 | 2/2003 | Discher et al. |
| 6,626,465 B2 | 9/2003 | Lacroix et al. |
| 6,786,516 B2 | 9/2004 | Cronley |
| 6,851,721 B2 | 2/2005 | Poder |
| 6,851,725 B2 | 2/2005 | Lutzke |
| 6,857,667 B2 | 2/2005 | Malone |
| 6,905,151 B2 | 6/2005 | Froment et al. |
| 6,926,312 B2 | 8/2005 | Lacroix et al. |
| 6,932,239 B2 | 8/2005 | McKitrick |
| 6,997,181 B2 | 2/2006 | Fletcher |
| 7,073,688 B2 | 7/2006 | Choi et al. |
| 7,140,645 B2 | 11/2006 | Cronley |
| 7,198,079 B2 | 4/2007 | Kline |
| 7,204,382 B2 | 4/2007 | Cezeaux |
| 7,234,733 B2 * | 6/2007 | Valentini .................. 285/314 |
| 7,296,568 B2 | 11/2007 | Capon et al. |
| 7,341,286 B2 | 3/2008 | Andre |
| 7,434,847 B2 | 10/2008 | Densel et al. |
| 7,448,653 B2 | 11/2008 | Jensen et al. |
| 7,497,231 B2 | 3/2009 | Sasa |
| 7,506,897 B2 | 3/2009 | Bauer |
| 2004/0079775 A1 | 4/2004 | Choi et al. |
| 2004/0089301 A1 | 5/2004 | Choi et al. |
| 2004/0265051 A1 * | 12/2004 | Tancredi et al. .............. 403/351 |
| 2005/0242109 A1 | 11/2005 | Reed |

* cited by examiner

SECURING MECHANISM FOR A COUPLING DEVICE

CROSS REFERENCE TO RELATED APPLICATION

This application is based upon and claims benefit of co-owned U.S. Provisional Patent Application Ser. No. 61/253,109 entitled "Securing Mechanism for a Coupling Device", filed with the U.S. Patent and Trademark Office on Oct. 20, 2009 by the inventors herein, the specification of which is incorporated herein by reference.

BACKGROUND

1. Field of the Invention

This invention generally relates to the field of personal protective devices and, in particular, to a securing mechanism for a coupling device that can be used for connecting a drinking tube of a protective mask with a hose for a drinking fluid container.

2. Background of the Prior Art

Protective suits worn by individuals in hazardous or contaminated environments often include protective masks. Governments, militaries, and private industries have developed such protective masks and suits in an attempt to allow personnel to function in areas where there may be nuclear, biological, or chemical contamination. These protective masks and suits are hot to wear. As a result, major problems for the wearers of such protective masks and suits include rapid and potentially life-threatening dehydration and associated elevated core body temperature, which necessitate frequent fluid intake.

Conventionally, a gas mask wearer, such as, for example only, a firefighter, rescue personnel, member of the military, and the like, desiring a drink while working in an environment containing harmful and possibly fatal air-born toxins must leave the environment so as not to contaminate the liquid source from which they intend to drink. Accordingly, the wearer of the gas mask is required to interrupt or stop performing their duties to leave the work environment.

Many masks, such as the "M" series protective type, have drinking tubes that allow the mask wearer to access and drink from compatible "canteen" fluid sources that permit continuous connection to a liquid source without requiring a gas mask wearer to remove the gas mask or connect and disconnect the liquid source to the gas mask each time the wearer wishes to drink from the liquid source. Today's operating environment may require military forces, allies, first responders, and critical infrastructure managers to remain "in place" for extended periods of time, even days, to accomplish their assigned tasks.

Alternatively, the wearer of the gas mask must connect the liquid source, such as, for example only, a canteen, to the gas mask while the wearer is in the harmful environment, which may require the wearer to put down any items in their hands, pick up the liquid source, and connect the liquid source to the gas mask so they may access the fluids in the liquid source. Such steps not only interrupt the work being performed by the gas mask wearer, but also introduce an undesirable risk of contaminating the liquid source or the wearer while being connected to and/or disconnected from the gas mask.

Another alternative may require the gas mask wearer to remove the gas mask to take a drink while they are in the harmful environment. Such an activity may prove harmful or fatal, depending on the toxins present in the harmful environment.

Once the gas mask is connected to the liquid source, it is important that the connection remain secure in order to both maintain the supply of liquid to the wearer and prevent risk of contamination of the connection fitting.

Accordingly, there is a need for a securing mechanism for the coupling device that delivers liquid to a gas mask wearer with a low risk of contamination of the drinking liquid, without interrupting the duties of the wearer, and/or exposing the wearer to risk or physical danger. There is a need for a securing mechanism that effectively maintains the gas mask coupled to the source of drinking liquid.

SUMMARY

It is, therefore, an object of the present invention to provide a securing mechanism for a coupling device that avoids the disadvantages of the prior art.

It is an object of the present invention to provide a securing mechanism that interfaces with currently available mask drinkstraw systems. It is a related object of the present invention to provide a securing mechanism that is designed to secure the gas mask fitting to the drinkstraw system.

It is another object of the present invention to provide a securing mechanism that is simple to operate. A related object is to provide a securing mechanism that is easy to manufacture. A further related object is to provide a securing mechanism that can be operated and used many times.

In accordance with the above objects, a securing mechanism for a coupling device is disclosed. In some embodiments, the coupling device comprises a fail-safe AVON™ type fitting with a compression securing mechanism. The securing mechanism enables secure connection of a gas mask to a chemical-biological warfare resistant water pouch to provide safe drinking water in contaminated environments. The securing mechanism is designed to interface with a variety of currently available coupling devices, particularly for mask drinkstraw systems.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF PREFERRED EMBODIMENTS

The invention summarized above and defined by the enumerated claims may be better understood by referring to the following description, which should be read in conjunction with the accompanying drawings in which like reference numbers are used for like parts. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
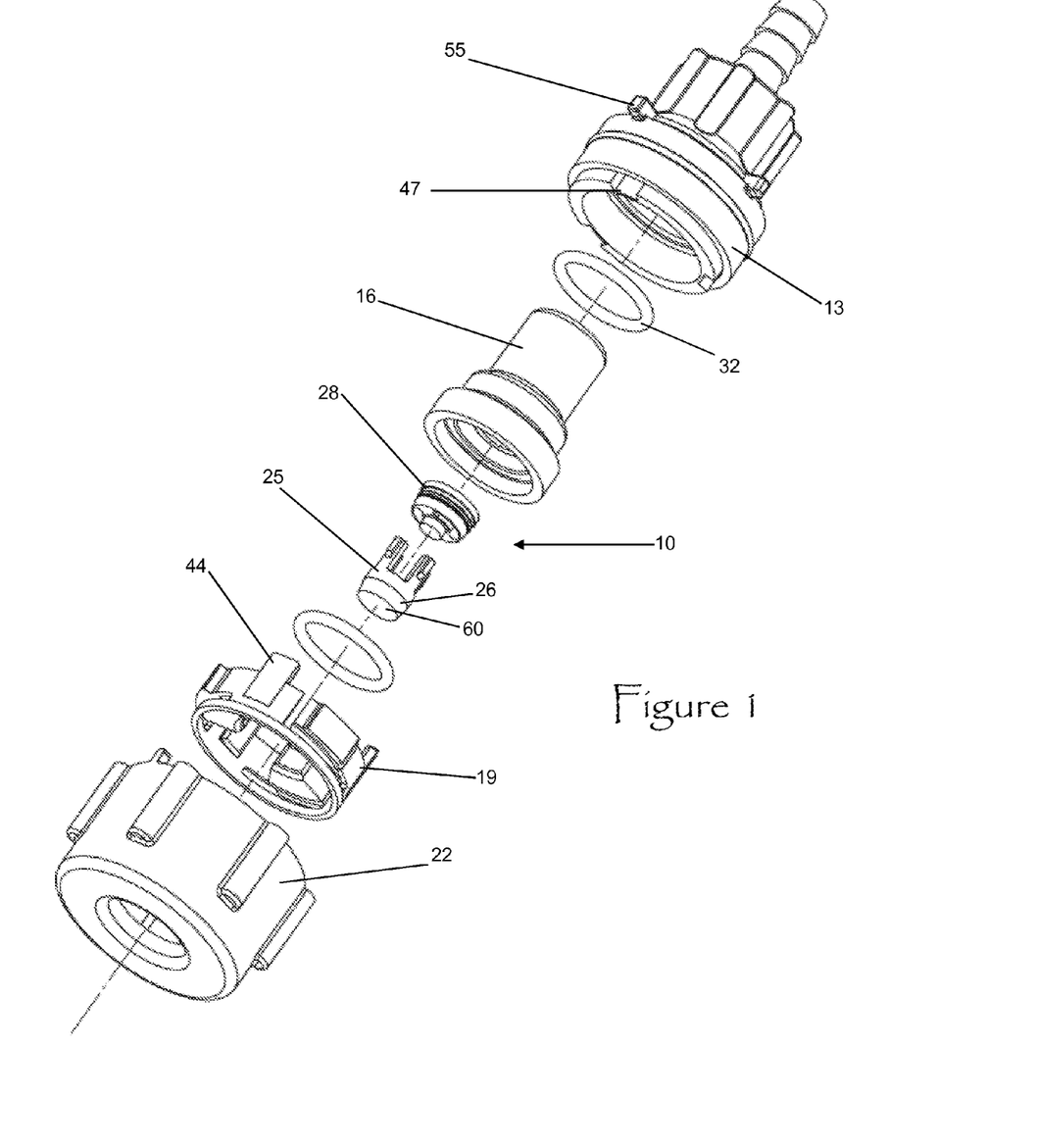
FIG. 1 shows an exploded view of a securing mechanism for a coupling device according to an embodiment of the present invention.
Figure 2:
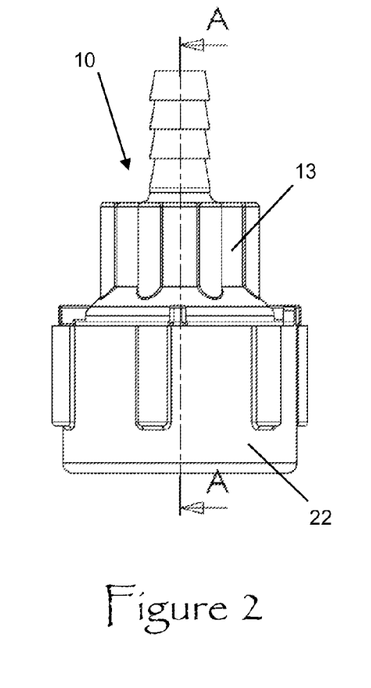
FIG. 2 shows a side elevational view of the coupling device according to the present invention.
Figure 3:
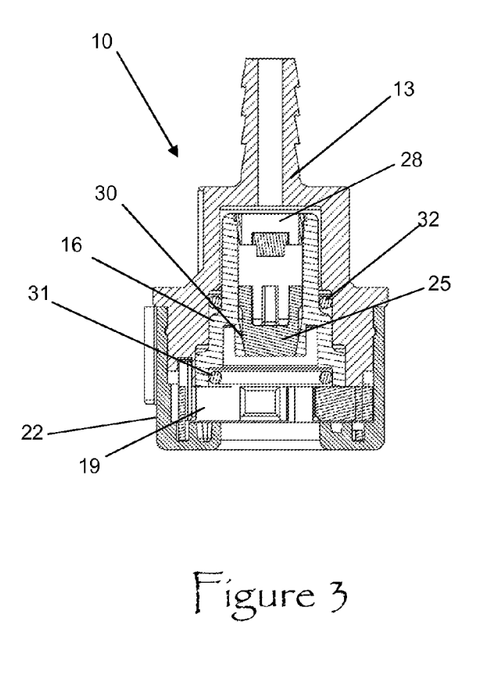
FIG. 3 shows a cross-section view of the coupling device taken along line A-A of FIG. 2.
Figure 4:
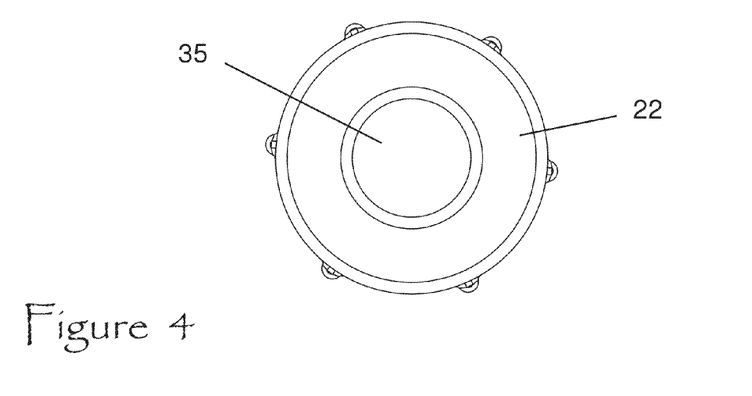
FIG. 4 shows a top plan view of a cover piece for the securing mechanism according to the present invention.
Figure 5:
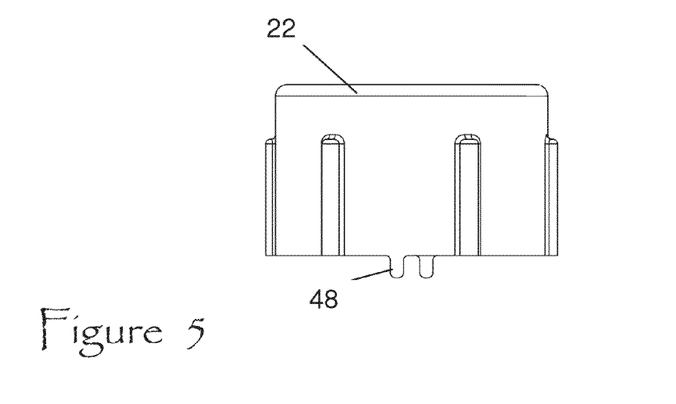
FIG. 5 shows a side view of the cover piece of FIG. 4.
Figure 6:
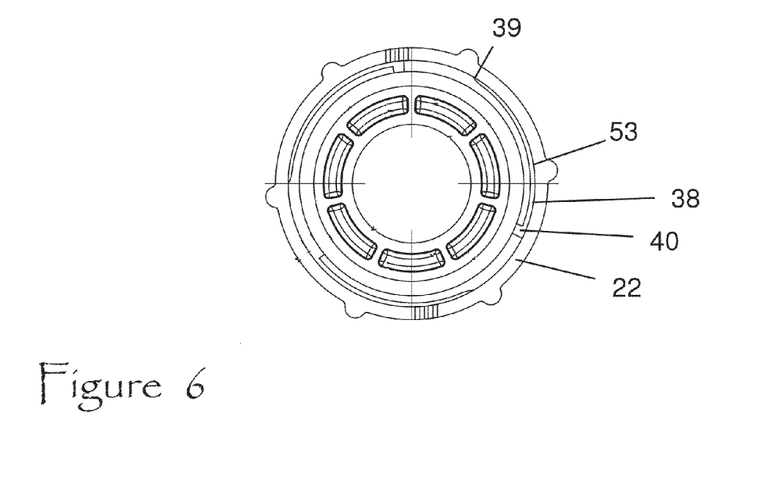
FIG. 6 shows a bottom plan view of the cover piece of FIG. 4.
Figure 7:
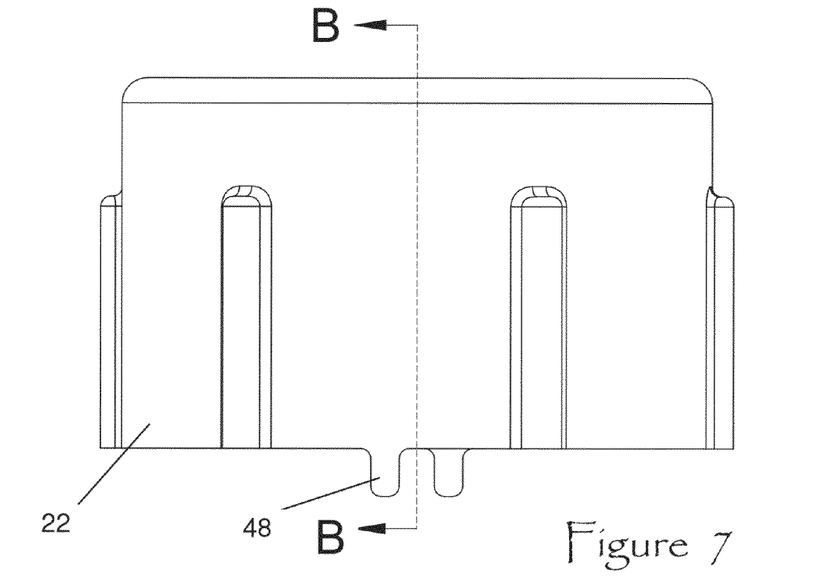
FIG. 7 shows a side elevational view of the cover piece for the coupling device according to the present invention.
Figure 8:
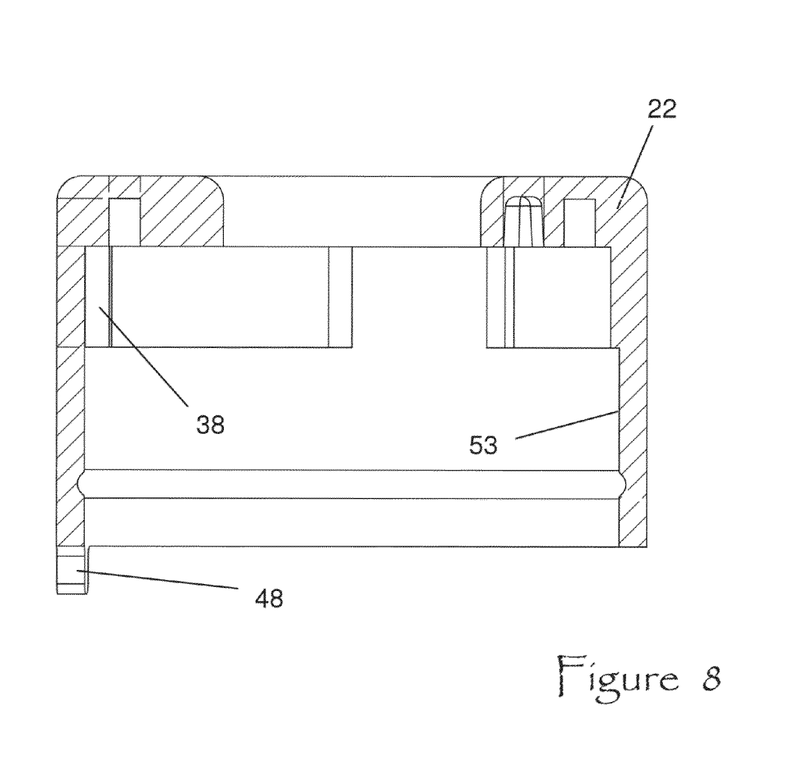
FIG. 8 shows a cross-section view of the cover piece taken along line B-B of FIG. 7.

Referring now to the drawings, FIGS. 1-3 show exploded, side, and cross-sectional views of a coupling device, indicated generally as 10, of the present invention. The coupling device 10 includes a body 13, an insert piece 16, a cam lock appliance 19, and a cover piece 22. The coupling device 10 may include a piston 25 and base 28 that serves to stop or permit the flow of fluid through the coupling device 10. In some embodiments, a spring (not shown) may be engaged between the piston 25 and base 28. In a preferred embodiment, the top portion 26 of the piston 25 is formed as a truncated cone to form a valve seal with a seating surface 30 of the insert piece 16 (see FIG. 14). A pair of O-rings 31, 32 may be included. The particular style and construction of the coupling device 10 is not critical in the practice of this invention.

Referring to FIGS. 4-8, the cover piece 22 includes an opening 35 providing an inlet port for insertion of a drink tube or connector, such as from a gas mask. On an inner wall 53 of the cover piece 22 are a plurality of raised ledges 38 that interact with the cam lock appliance 19, as described further below. The raised ledges 38 begin from a starting position 39 substantially flush with the inner wall 53 of the cover piece 22 and taper toward the middle of the cover piece 22, ending at a stop piece 40.

The cover piece 22 may include one or more tabs 48 that engage an abutment 55 on the body 13 when the cover piece 22 is rotated in operation. The interaction of the tab 48 and abutment 55 limits the amount and direction of rotation of the cover piece 22.

Figure 9:
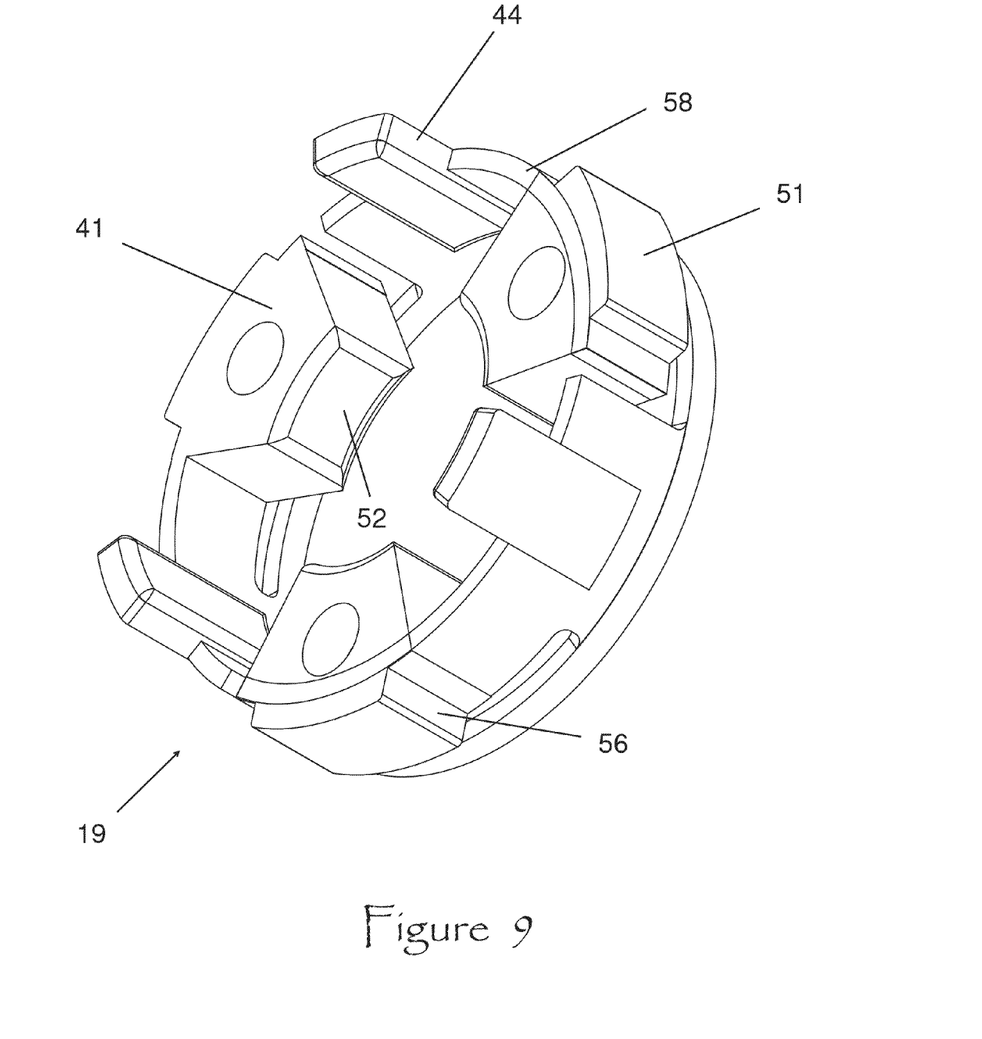
FIG. 9 shows a perspective view of a cam lock appliance according to an embodiment of the present invention.
Figure 10:
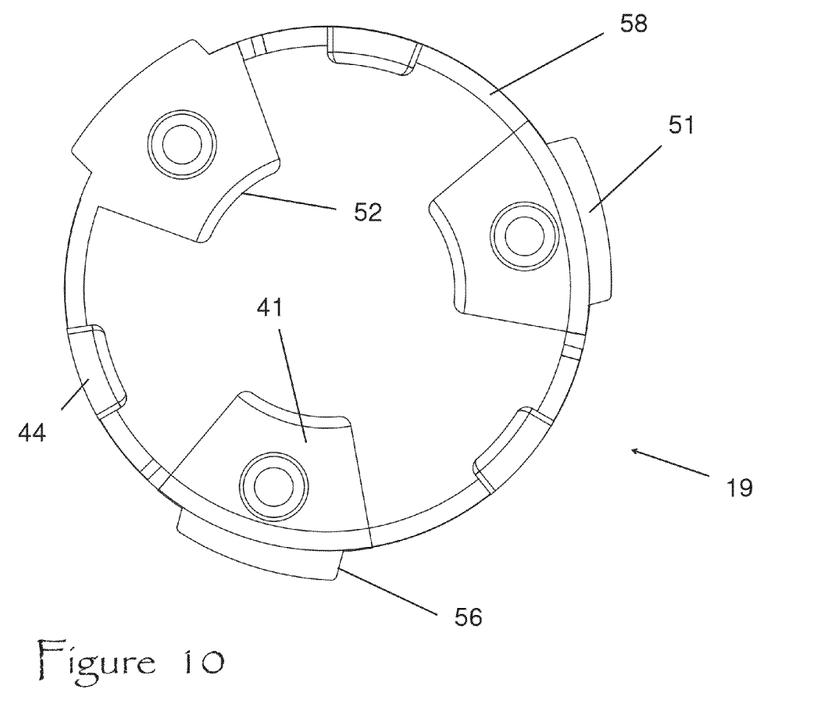
FIG. 10 shows a top plan view of the cam lock appliance of FIG. 9.
Figure 11:
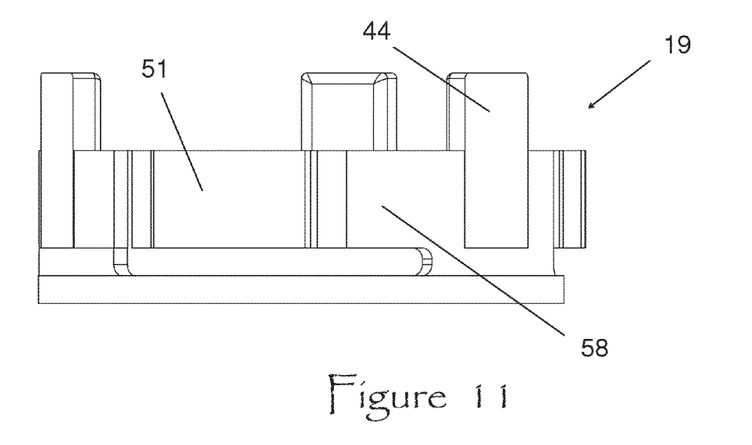
FIG. 11 shows a side view of the cam lock appliance of FIG. 9.

FIGS. 9-11 show the cam lock appliance 19 according to the present invention. The cam lock appliance 19 includes a plurality of wedges 41 and a plurality of legs 44. When the coupling device 10 is assembled, the legs 44 are engaged with the body 13, such as in a plurality of slots 47 (FIG. 1), to prevent the cam lock appliance 19 from rotating during operation. The wedges 41 have a raised back 51 and a concave curved face 52. Each wedge 41 is mounted on a flexible arm 58 that extends from each leg 44 substantially perpendicular. The arm 58 is attached to the leg 44 on only one end, as best seen in FIG. 9. In use, the cover piece 22 is at least partially rotatable around the body 13. When the cover piece is rotated approximately 90° in a first direction, the raised ledges 38 push against the back 51 of the wedges 41 causing the arm 58 to be partly displaced toward the middle of the cam lock appliance 19. The cover piece 22 can be rotated until a side 56 of the raised back 51 contacts the stop piece 40. The curved face 52 of the wedge 41 is caused to press against a drink tube or other cylindrical device placed in the opening 35. Upon rotating the cover piece 22 in a second, opposite direction, the wedges 41 release the drink tube and return to their original position.

Figure 12:
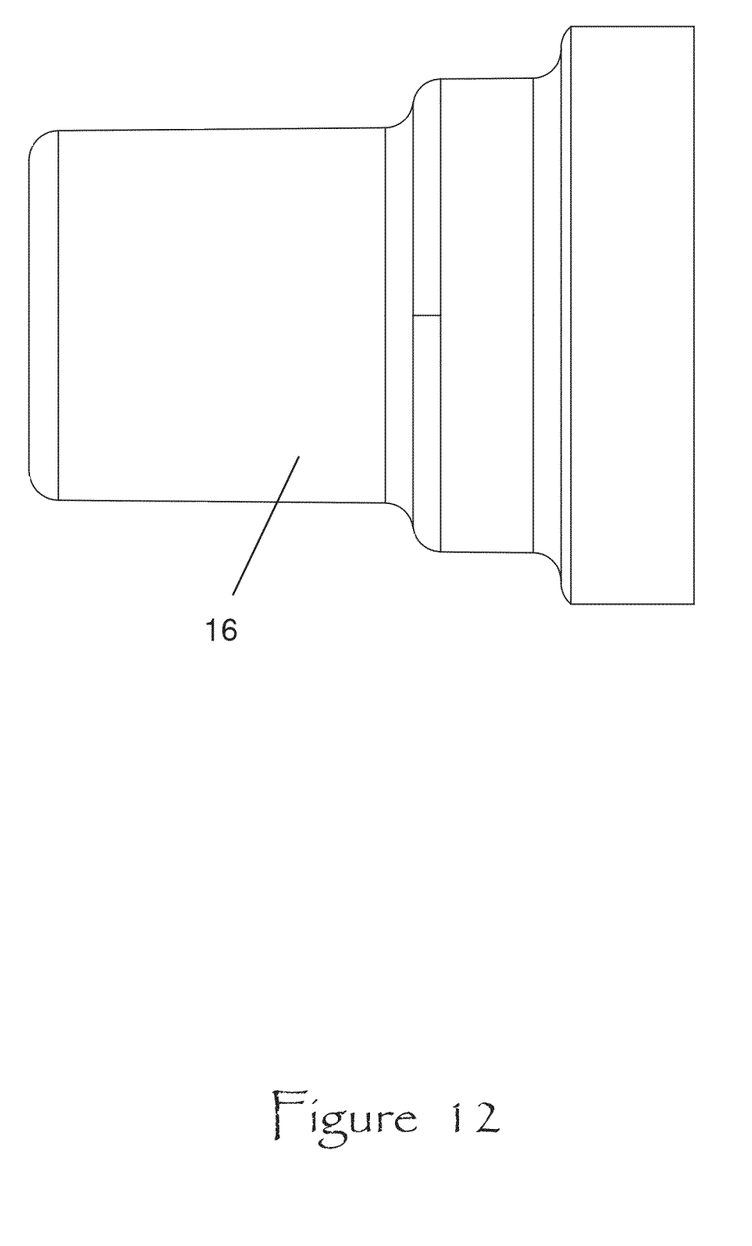
FIG. 12 shows a side elevational view of an insert piece for the coupling device according to the present invention.
Figure 13:
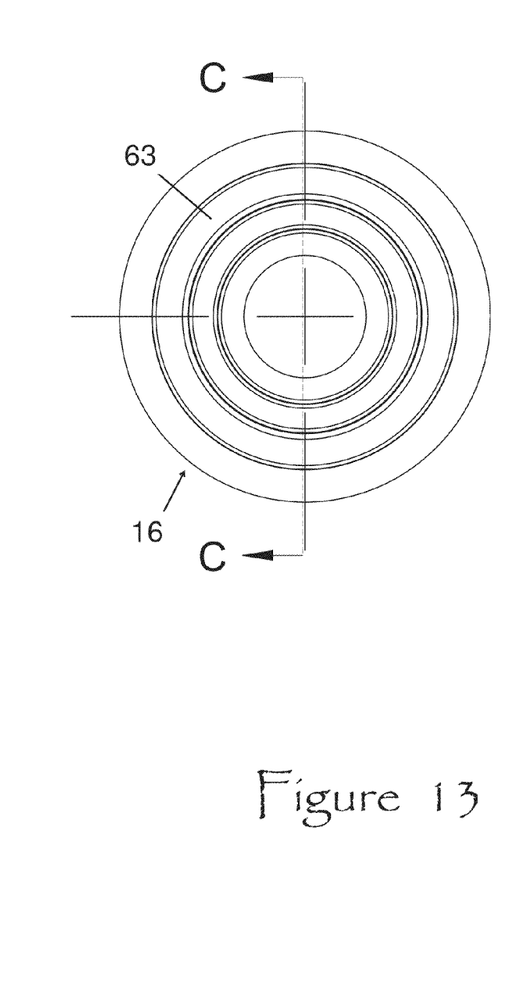
FIG. 13 shows a top plan view of the insert piece of FIG. 12.
Figure 14:
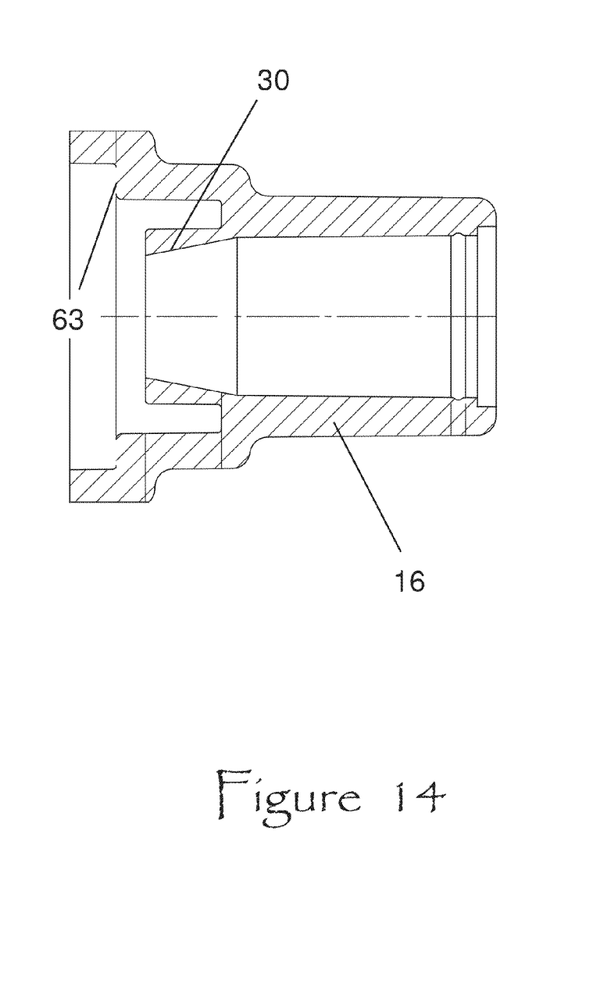
FIG. 14 shows a cross-section view of the insert piece taken along line C-C of FIG. 13.

FIGS. 12-14 show the insert piece 16 of the present invention. The insert piece 16 houses a piston 25 and base 28 that serve to stop or permit the flow of fluid through the coupling device 10. In some embodiments, a spring (not shown) may be engaged between the piston 25 and base 28. In a preferred embodiment, the top portion 26 of the piston 25 is formed as a truncated cone to form a valve seal with a seating surface 30 of the insert piece 16. When a drink tube is inserted in the opening 35 of the cover piece 22, the drink tube presses against the top surface 60 of the piston 25 causing the piston 25 to displace inwardly, thereby opening an unobstructed path through the coupling device. The top ledge 63 of the insert piece is sized and configured to hold an O-ring 31. The O-ring 31 cooperates with the design of the drink tube to prevent leakage. Once the drink tube has been inserted sufficiently, the cover piece 22 can be rotated to lock the drink tube in place in order to prevent inadvertent removal.

It should be understood that this invention is not limited to a drink tube connection as described above. The securing mechanism may be made in a variety of shapes and sizes, depending on a given end use. While the coupling device 10 is particularly well suited for an AVON™ type fitting, it is contemplated that the features taught herein may be applied to other coupling devices, as well.

The invention has been described with references to preferred embodiments. While specific values, relationships, materials and steps have been set forth for purposes of describing concepts of the invention, it will be appreciated by persons skilled in the art that numerous variations and/or modifications can be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with the underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

What is claimed is:

1. A coupling device configured for connecting a drinkable fluid source to a human-worn, personal protective device without contaminating the drinkable fluid source or an environment inside of the personal protective device, said coupling device comprising:

a body having a body fluid inlet end configured for attachment to a drinkable fluid source, and a body fluid outlet end opposite said body fluid inlet end;

a cover piece extending around and being at least partially rotatable around said body fluid outlet end, said cover piece being substantially cylindrical and having a longitudinal central axis aligned with a longitudinal central axis of said coupling device, and having a cover piece fluid outlet end, said cover piece fluid outlet end being configured to removably receive a fluid connector from a drink system attached to a personal protective device;

a cam lock appliance disposed within said cover piece, said cam lock appliance having a plurality of wedges attached to flexible arms so as to allow radially inward movement of said wedges; and a piston within said coupling device and moveable along said longitudinal axis of said coupling device from a closed position that prevents fluid flow from a drinkable fluid source to a fluid connector from a drink system, to an open position that allows fluid flow from a drinkable fluid source to a fluid connector from a drink system, said piston being configured to move from said closed position to said open position upon insertion of a fluid connector into said cover piece fluid outlet end;

wherein rotation of said cover piece in a first direction causes said wedges to be displaced toward said central axis of said coupling device so as to grip a fluid connector inserted within said cover piece fluid outlet end, and rotation of said cover piece in a second, opposite direction allows said wedges to return to a non-displaced position.

2. The coupling device of claim 1, wherein said cam lock appliance is engaged with said body so as to prevent relative rotation between said cam lock appliance and said body.

3. The coupling device of claim 1, wherein said piston is biased towards said closed position.

4. The coupling device of claim 1, further comprising an insert piece positioned within said body, said insert piece having an insert piece fluid inlet end and an insert piece fluid outlet end opposite said insert piece fluid inlet end, said insert piece fluid outlet end forming a cylindrical opening defining a seating surface for said piston.

5. The coupling device of claim 4, wherein said piston seals against said seating surface when said piston is in said closed position.

6. The coupling device of claim 5, wherein said piston is configured to move away from said seating surface when engaged by at least a portion of a fluid connector from a drink system.

7. The coupling device of claim 1, said cover piece further comprising:

a plurality of raised ledges configured to move said wedges of said cam lock appliance upon rotation of said cover piece with respect to said body.

8. The coupling device of claim 7, said raised ledges being disposed on an inner wall of said cover piece, wherein said ledges extend from a starting position substantially flush with said inner wall of said cover piece, taper toward the middle of said cover piece, and terminate at a stop piece.

9. The coupling device of claim 1, said cover piece further comprising a tab, and said body further comprising an abutment, wherein interaction of said tab with said abutment limits an amount and direction of rotation of said cover piece with respect to said body.

10. The coupling device of claim 1, said cam lock appliance further comprising a plurality of legs engaging said body, wherein said flexible arms of said cam lock appliance extend substantially perpendicular from said legs.

11. The coupling device of claim 1, wherein each of said wedges of said cam lock appliance comprises a raised back that interacts with a tapered ledge disposed on an inner wall of said cover piece.

12. The coupling device of claim 1, wherein each of said wedges comprises a concave, curved face.

13. The coupling device of claim 1, said cam lock appliance further comprising at least one leg extending longitudinally from an edge of said cam lock appliance and toward said fluid inlet end of said body.

14. The coupling device of claim 13, wherein said leg engages a slot on said body to prevent relative rotation between said cam lock appliance and said body.

* * * * *